(12) United States Patent
Shioya et al.

(10) Patent No.: US 11,492,480 B2
(45) Date of Patent: Nov. 8, 2022

(54) FLUOROELASTOMER COMPOSITION AND MOLDED ARTICLE THEREOF

(71) Applicants: TOKYO INSTITUTE OF TECHNOLOGY, Tokyo (JP); DAIKIN INDUSTRIES, LTD., Osaka (JP)

(72) Inventors: Masatoshi Shioya, Tokyo (JP); Kenta Kubo, Tokyo (JP); Shinya Maruta, Tokyo (JP); Tsuyoshi Noguchi, Osaka (JP)

(73) Assignees: TOKYO INSTITUTE OF TECHNOLOGY, Tokyo (JP); DAIKIN INDUSTRIES, LTD., Osaka (JP)

(*) Notice: Subject to any disclaimer, the term of this patent is extended or adjusted under 35 U.S.C. 154(b) by 242 days.

(21) Appl. No.: 16/619,698

(22) PCT Filed: Jun. 4, 2018

(86) PCT No.: PCT/JP2018/021361
§ 371 (c)(1),
(2) Date: Dec. 5, 2019

(87) PCT Pub. No.: WO2018/225682
PCT Pub. Date: Dec. 13, 2018

(65) Prior Publication Data
US 2020/0181386 A1    Jun. 11, 2020

(30) Foreign Application Priority Data

Jun. 6, 2017 (JP) .............................. JP2017-111997

(51) Int. Cl.
| | | |
|---|---|---|
| *C08L 27/12* | (2006.01) | |
| *C08L 27/22* | (2006.01) | |
| *C08K 3/04* | (2006.01) | |
| *C08K 5/00* | (2006.01) | |
| *C08K 5/3445* | (2006.01) | |
| *C08K 5/353* | (2006.01) | |
| *C08K 5/46* | (2006.01) | |
| *B29C 43/00* | (2006.01) | |
| *B29C 45/00* | (2006.01) | |
| *B29C 48/00* | (2019.01) | |

(52) U.S. Cl.
CPC ............ *C08L 27/12* (2013.01); *B29C 43/003* (2013.01); *B29C 45/0001* (2013.01); *B29C 48/022* (2019.02); *C08K 3/042* (2017.05); *C08K 5/0025* (2013.01); *C08K 5/3445* (2013.01); *C08K 5/353* (2013.01); *C08K 5/46* (2013.01); *C08L 27/22* (2013.01); *C08K 2201/016* (2013.01); *C08L 2201/08* (2013.01); *C08L 2207/04* (2013.01)

(58) Field of Classification Search
CPC ...... C08L 27/12; C08L 27/22; C08L 2207/04; C08L 2201/08; C08K 3/042; C08K 5/0025; C08K 5/3445; C08K 5/353; C08K 2201/016; C08K 5/46; B29C 43/003; B29C 45/0001; B29C 48/022
See application file for complete search history.

(56) References Cited

U.S. PATENT DOCUMENTS

| | | | |
|---|---|---|---|
| 2013/0015409 A1 | 1/2013 | Fugetsu | |
| 2014/0323610 A1* | 10/2014 | Liu | ........................ C08K 5/548 524/424 |

FOREIGN PATENT DOCUMENTS

| | | | |
|---|---|---|---|
| JP | 2010-209275 A | 9/2010 | |
| JP | 2010209275 A * | 9/2010 | |
| JP | 2013-023575 A | 2/2013 | |
| JP | 2015-140400 A | 8/2015 | |
| WO | 2011/074125 A1 | 6/2011 | |
| WO | WO-2011074125 A1 * | 6/2011 | ............. C01B 32/23 |
| WO | 2016/154057 A1 | 9/2016 | |

OTHER PUBLICATIONS

International Preliminary Report on Patentability with a Translation of Written Opinion in International Application No. PCT/JP2018/021361, dated Dec. 10, 2019.
Communication dated Feb. 22, 2021 by the European Patent Office in application No. 18813060.3.
Maryam Khajehpour et al., "Tuning the curing behavior of fluoroelastomer (FKM) by incorporation of nitrogen doped graphene nanoribbons (CNx-GNRs)", Polymer, 2014, pp. 6293-6302, vol. 55.
International Search Report for PCT/JP2018/021361 dated Jul. 31, 2018 [PCT/ISA/210].

* cited by examiner

*Primary Examiner* — Robert D Harlan
(74) *Attorney, Agent, or Firm* — Sughrue Mion, PLLC

(57) ABSTRACT

The invention provides a fluoroelastomer composition that can be crosslinked at an industrially sufficient rate without the use of a graphene having specific surface properties and can provide a fluoroelastomer molded article having higher tensile strength and better abrasion resistance than conventional fluoroelastomer molded articles even though having a similar tensile modulus to conventional fluoroelastomer molded articles. The fluoroelastomer composition contains a fluoroelastomer that contains a crosslinkable group-containing monomer unit and an elongated sheet-shaped graphene. The graphene exhibits a ratio (L/W) of a maximum length (L) and a width (W) of 2 to $10^5$, and the graphene exhibits a ratio (L/T) of the maximum length (L) and a thickness (T) of $1 \times 10^1$ to $1 \times 10^7$.

6 Claims, No Drawings

FLUOROELASTOMER COMPOSITION AND MOLDED ARTICLE THEREOF

CROSS REFERENCE TO RELATED APPLICATIONS

This application is a National Stage of International Application No. PCT/JP2018/021361 filed Jun. 4, 2018, claiming priority based on Japanese Patent Application No. 2017-111997 filed Jun. 6, 2017.

TECHNICAL FIELD

The invention relates to fluoroelastomer compositions and molded articles thereof.

BACKGROUND ART

Fluoroelastomers are known as elastomers having excellent characteristics such as heat resistance, oil resistance, and chemical resistance. Adding a filler such as carbon black to fluoroelastomers can improve the above characteristics of fluoroelastomers.

For example, Patent Literature 1 discloses that a carbon fiber composite material in which carbon nanofibers are dispersed in a perfluoroelastomer can have excellent heat resistance and chemical resistance.

Non-Patent Literature 1 discloses that multiple species of graphene nanoribbon are blended into a fluoroelastomer (FKM) (a copolymer of vinylidene fluoride, hexafluoropropylene, and tetrafluoroethylene).

CITATION LIST

Patent Literature

Patent Literature 1: JP 2013-23575 A

Non-Patent Literature

Non-Patent Literature 1: Maryam Khajehpour and 3 others, "Tuning the curing behavior of fluoroelastomer (FKM) by incorporation of nitrogen doped graphene nanoribbons (CNx-GNRs)", Polymer, Elsevier Ltd., 2014, Vol. 55, No. 24, pp. 6293-6302

Non-Patent Literature 2: Toshihira Irisawa and 4 others, "Wear Resistance and Tensile Properties of Filler-added Polyamide 6 Fibers", Sen'i Gakkaishi, 2011, Vol. 67, No. 5, pp. 109-118

SUMMARY OF INVENTION

Technical Problem

A fluoroelastomer composition is still awaited which can provide a fluoroelastomer molded article having a similar tensile modulus to the carbon fiber composite material disclosed in Patent Literature 1 and having higher tensile strength and better abrasion resistance than the carbon fiber composite material disclosed in Patent Literature 1.

Non-Patent Literature 1 discloses that a reduced nitrogen-doped graphene nanoribbon exhibited a crosslinking behavior similar to that of pure FKM, but an oxidized graphene nanoribbon exhibited a relatively low crosslinking rate. Still, the type of graphene nanoribbon is preferably not limited because, in such a case, a variety of characteristics can be given to a fluoroelastomer molded article.

In view of the above state of the art, the invention aims to provide a fluoroelastomer composition that can be crosslinked at an industrially sufficient rate without the use of a graphene having specific surface properties and can provide a fluoroelastomer molded article having higher tensile strength and better abrasion resistance than conventional fluoroelastomer molded articles even though having a similar tensile modulus to conventional fluoroelastomer molded articles.

Solution to Problem

The inventors examined a solution to the above issue to find that use of a fluoroelastomer that contains a crosslinkable group-containing monomer unit as a fluoroelastomer and blending a graphene having a specific shape with the fluoroelastomer enable crosslinking of the fluoroelastomer at an industrially sufficient rate without the use of a graphene having specific surface properties, and allow the resulting fluoroelastomer molded article to have a similar tensile modulus to conventional fluoroelastomer molded articles and to have higher tensile strength and better abrasion resistance than conventional fluoroelastomer molded articles. As a result, the inventors completed the invention.

Specifically, the invention relates to a fluoroelastomer composition including: a fluoroelastomer that contains a crosslinkable group-containing monomer unit; and an elongated sheet-shaped graphene, the graphene exhibiting a ratio (L/W) of a maximum length (L) and a width (W) of 2 to $10^5$, and the graphene exhibiting a ratio (L/T) of the maximum length (L) and a thickness (T) of $1\times10^1$ to $1\times10^7$.

The fluoroelastomer is preferably a perfluoroelastomer.

The crosslinkable group is preferably at least one selected from the group consisting of a cyano group, a carboxy group, an alkoxycarbonyl group, and an acid halide group.

The fluoroelastomer composition preferably contains the graphene in an amount of 0.1 to 20% by mass of a sum of amounts of the fluoroelastomer and the graphene.

Preferably, the fluoroelastomer composition further contains a catalyst that generates a triazine ring and the crosslinkable group is a cyano group.

The fluoroelastomer composition preferably further contains a cross-linking agent.

The cross-linking agent is preferably at least one selected from the group consisting of an oxazole cross-linking agent, an imidazole cross-linking agent, and a thiazole cross-linking agent.

The invention also relates to a fluoroelastomer molded article formed from the aforementioned fluoroelastomer composition.

Advantageous Effects of Invention

The fluoroelastomer composition of the invention can be crosslinked at an industrially sufficient rate without the use of a graphene having specific surface properties and can provide a fluoroelastomer molded article having excellent abrasion resistance. The fluoroelastomer composition of the invention can provide a fluoroelastomer molded article having high tensile strength even though having a similar tensile modulus to conventional fluoroelastomer molded articles.

The fluoroelastomer molded article of the invention can be efficiently produced and can have high tensile strength and excellent abrasion resistance.

DESCRIPTION OF EMBODIMENTS

The invention will be specifically described hereinbelow.

The fluoroelastomer composition of the invention contains a fluoroelastomer and a graphene.

The fluoroelastomer as used herein means an amorphous fluoropolymer. The term "amorphous" as used herein means that the fluoropolymer has a melting peak (ΔH) of 4.5 J/g or lower in differential scanning calorimetry (DSC) (temperature-increasing rate: 10° C./min) or differential thermal analysis (DTA) (temperature-increasing rate: 10° C./min). The fluoroelastomer after being crosslinked exhibits elastomeric characteristics. The elastomeric characteristics as used herein mean the characteristics such that the polymer can be stretched and can return to the original length after the force needed to stretch the polymer is no longer applied.

The fluoroelastomer contains a crosslinkable group-containing monomer unit. The crosslinkable group-containing monomer as used herein means an ethylenically unsaturated compound containing at least one crosslinkable group in the molecule. The crosslinkable group is a group that can form a three-dimensional network structure. The crosslinkable groups may react with each other to form a crosslinked structure, or a crosslinkable group and a functional group contained in a cross-linking agent that may be used as needed may react with each other to form a crosslinked structure.

In order to enable a crosslinking reaction at a sufficient rate without the use of a graphene having specific surface properties and to provide a fluoroelastomer molded article having much higher tensile strength and much better abrasion resistance, the crosslinkable group is preferably at least one selected from the group consisting of a hydroxy group (—OH), an iodine atom (—I), a bromine atom (—Br), a cyano group (—CN group), a carboxy group (—COOH group), an alkoxycarbonyl group, and an acid halide group, more preferably at least one selected from the group consisting of a cyano group, a carboxy group, an alkoxycarbonyl group, and an acid halide group, still more preferably at least one selected from the group consisting of a cyano group and a carboxy group, particularly preferably a cyano group.

The alkoxycarbonyl group is preferably represented by the formula: —COOR (wherein R is a monovalent organic group). The acid halide group is preferably represented by the formula: —COX (wherein X is a halogen atom).

In order to allow the crosslinking reaction to proceed at a sufficient rate without the use of a graphene having specific surface properties to lead to a fluoroelastomer molded article having much higher tensile strength and much better abrasion resistance, the crosslinkable group-containing monomer unit is preferably present in an amount of 0.01 to 30 mol %, more preferably 0.1 to 20 mol %, still more preferably 0.1 to 10 mol %, particularly preferably 0.1 to 5 mol %, most preferably 0.1 to 3 mol % in the fluoroelastomer.

In the description, the amounts of the monomers constituting the fluoroelastomer can be calculated by any appropriate combination of NMR, FT-IR, elemental analysis, and X-ray fluorescence analysis in accordance with the types of the monomers.

The crosslinkable group-containing monomer is preferably at least one selected from the group consisting of:

a fluoromonomer represented by the formula (1):

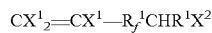

(wherein $X^1$ is a hydrogen atom, a fluorine atom, or $CH_3$; $R_f^1$ is a fluoroalkylene group, a perfluoroalkylene group, a fluoro(poly)oxyalkylene group, or a perfluoro(poly)oxyalkylene group; $R^1$ is a hydrogen atom or $CH_3$; and $X^2$ is an iodine atom or a bromine atom); a fluoromonomer represented by the formula (2):

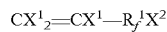

(wherein $X^1$ is a hydrogen atom, a fluorine atom, or $CH_3$; $R_f^1$ is a fluoroalkylene group, a perfluoroalkylene group, a fluoro(poly)oxyalkylene group, or a perfluoro(poly)oxyalkylene group; and $X^2$ is an iodine atom or a bromine atom);

a fluoromonomer represented by the formula (3):

(wherein m is an integer of 0 to 5; n is an integer of 1 to 3; and $X^3$ is a cyano group, a carboxy group, an alkoxycarbonyl group, an iodine atom, a bromine atom, or —$CH_2I$);

a fluoromonomer represented by the formula (4):

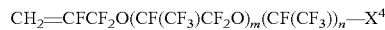

(wherein m is an integer of 0 to 5; n is an integer of 1 to 3; and $X^4$ is a cyano group, a carboxy group, an alkoxycarbonyl group, an iodine atom, a bromine atom, or —$CH_2OH$); and a monomer represented by the formula (5):

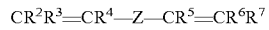

(wherein $R^2$ to $R^7$ are the same as or different from each other, and are each a hydrogen atom or a C1-C5 alkyl group; Z is a C1-C18 linear or branched alkylene group optionally containing an oxygen atom, a C3-C18 cycloalkylene group, a C1-C10 alkylene or oxyalkylene group that is at least partially fluorinated, or a (per) fluoropolyoxyalkylene group that has a molecular weight of 500 to 10000 and is represented by the formula: -$(Q)_p$-$CF_2O$—$(CF_2CF_2O)_m$ $(CF_2O)_n$—$CF_2$-$(Q)_p$-, wherein Q is an alkylene group or an oxyalkylene group; p is 0 or 1; and m/n is 0.2 to 5).

$X^1$ is preferably a fluorine atom. $R_f^1$ is preferably a C1-C5 perfluoroalkylene group. $R^1$ is preferably a hydrogen atom. $X^3$ is preferably a cyano group, an alkoxycarbonyl group, an iodine atom, a bromine atom, or —$CH_2I$. $X^4$ is preferably a cyano group, an alkoxycarbonyl group, an iodine atom, a bromine atom, or —$CH_2OH$.

The crosslinkable group-containing monomer is preferably at least one selected from the group consisting of $CF_2$=$CFOCF_2CF(CF_3)$ $OCF_2CF_2CN$, $CF_2$=$CFOCF_2CF$ $(CF_3)$ $OCF_2CF_2COOH$, $CF_2$=$CFOCF_2CF(CF_3)$ $OCF_2CF_2CH_2I$, $CF_2$=$CFOCF_2CF_2CH_2I$, $CH_2$=$CFCF_2OCF(CF_3)$ $CF_2OCF(CF_3)$ CN, $CH_2$=$CFCF_2OCF(CF_3)$ $CF_2OCF(CF_3)$ COOH, $CH_2$=$CFCF_2OCF(CF_3)$ $CF_2OCF(CF_3)$ $CH_2OH$, $CH_2$=$CHCF_2CF_2I$, $CH_2$=$CH(CF_2)_2CH$=$CH_2$, $CH_2$=$CH$ $(CF_2)_6CH$=$CH_2$, and $CF_2$=$CFO(CF_2)_5CN$, more preferably at least one selected from the group consisting of $CF_2$=$CFOCF_2CF(CF_3)OCF_2CF_2CN$ and $CF_2$=$CFOCF_2CF_2CH_2I$.

The crosslinkable group-containing monomer is also preferably a cyano group-containing (—CN group-containing) monomer. A fluoroelastomer containing a cyano group-containing monomer unit can be crosslinked as a result of cyclotrimerization of the cyano group into a triazine ring. Thus, the crosslinking reaction thereof proceeds at a sufficient rate without the use of a graphene having specific surface properties and the fluoroelastomer can provide a fluoroelastomer molded article having much higher tensile strength and much better abrasion resistance, as well as excellent compression set and heat resistance.

Examples of the cyano group-containing monomer include monomers represented by any of the following formulas (11) to (27):

$$CY^{11}_2=CY^{11}(CF_2)_n-CN \quad (11)$$

(wherein $Y^{11}$ is a hydrogen atom or a fluorine atom; and n is an integer of 1 to 8);

$$CF_2=CFCF_2R_f^{12}-CN \quad (12)$$

(wherein $R_f^{12}$ is —$(OCF_2)_n$— or —$(OCF(CF_3))_n$—; and n is an integer of 0 to 5);

$$CF_2=CFCF_2(OCF(CF_3)CF_2)_m(OCH_2CF_2CF_2)_nOCH_2CF_2-CN \quad (13)$$

(wherein m is an integer of 0 to 5; and n is an integer of 0 to 5);

$$CF_2=CFCF_2(OCH_2CF_2CF_2)_m(OCF(CF_3)CF_2)_nOCF(CF_3)-CN \quad (14)$$

(wherein m is an integer of 0 to 5; and n is an integer of 0 to 5);

$$CF_2=CF(OCF_2CF(CF_3))_mO(CF_2)_n-CN \quad (15)$$

(wherein m is an integer of 0 to 5; and n is an integer of 1 to 8);

$$CF_2=CF(OCF_2F(CF_3))_m-CN \quad (16)$$

(wherein m is an integer of 1 to 5);

$$CF_2=CFOCF_2(CF(CF_3)OCF_2)_nCF(-CN)CF_3 \quad (17)$$

(wherein n is an integer of 1 to 4);

$$CF_2=CFO(CF_2)_nOCF(CF_3)-CN \quad (18)$$

(wherein n is an integer of 2 to 5)

$$CF_2=CFO(CF_2)_n-(C_6H_4)-CN \quad (19)$$

(wherein n is an integer of 1 to 6);

$$CF_2=CF(OCF_2CF(CF_3))_nOCF_2CF(CF_3)-CN \quad (20)$$

(wherein n is an integer of 1 or 2);

$$CH_2=CFCF_2O(CF(CF_3)CF_2O)_nCF(CF_3)-CN \quad (21)$$

(wherein n is an integer of 0 to 5);

$$CF_2=CFO(CF_2CF(CF_3)O)_m(CF_2)_n-CN \quad (22)$$

(wherein m is an integer of 0 to 5; and n is an integer of 1 to 3);

$$CH_2=CFCF_2OCF(CF_3)OCF(CF_3)-CN \quad (23)$$

$$CH_2=CFCF_2OCH_2CF_2-CN \quad (24)$$

$$CF_2=CFO(CF_2CF(CF_3)O)_mCF_2CF(CF_3)-CN \quad (25)$$

(wherein m is an integer of 0 or greater);

$$CF_2=CFOCF(CF_3)CF_2O(CF_2)_n-CN \quad (26)$$

(wherein n is an integer of 1 or greater); and $$CF_2=CFOCF_2OCF_2CF(CF_3)OCF_2-CN \quad (27).$$

These monomers may be used alone or in any combination.

Preferred among these is a monomer represented by the formula (15) or (22), more preferred is $CF_2=CFOCF_2CF(CF_3)OCF_2CF_2CN$.

The monomers represented by any of the formulas (11) to (27) each have a cyano group. This cyano group is cyclotrimerized, so that triazine crosslinking proceeds.

The fluoroelastomer may be either a partially fluorinated elastomer or a perfluoroelastomer, and is preferably the above perfluoroelastomer.

The partially fluorinated elastomer as used herein means a fluoropolymer that contains a fluoromonomer unit and also contains a perfluoromonomer unit in an amount of less than 90 mol % of all polymerized units, that has a glass transition temperature of 20° C. or lower, and that has a melting peak ($\Delta H$) of 4.5 J/g or lower.

The perfluoroelastomer as used herein means a fluoropolymer that contains a perfluoromonomer unit in an amount of 90 mol % or more of all polymerized units, that has a glass transition temperature of 20° C. or lower, that has a melting peak ($\Delta H$) of 4.5 J/g or lower, and that has a fluorine atom concentration of 71% by mass or more in the fluoropolymer. The fluorine atom concentration in the fluoropolymer as used herein means the concentration (% by mass) of the fluorine atoms contained in the fluoropolymer and is determined by calculation based on the types and amounts of the monomers constituting the fluoropolymer.

The perfluoromonomer as used herein means a monomer containing no carbon-hydrogen bond in the molecule. The perfluoromonomer may be a monomer containing carbon atoms and fluorine atoms in which some fluorine atoms binding to any carbon atom are optionally replaced by chlorine atoms, and may be a monomer containing carbon atoms, as well as a nitrogen atom, an oxygen atom, and a sulfur atom. The perfluoromonomer is preferably a monomer in which all hydrogen atoms are replaced by fluorine atoms. The perfluoromonomer does not encompass the crosslinkable group-containing monomer.

Examples of the partially fluorinated elastomer include a vinylidene fluoride (VdF)/crosslinkable group-containing monomer-based fluoroelastomer, a tetrafluoroethylene (TFE)/propylene (Pr)/crosslinkable group-containing monomer-based fluoroelastomer, a TFE/Pr/VdF/crosslinkable group-containing monomer-based fluoroelastomer, an ethylene/hexafluoropropylene (HFP)/crosslinkable group-containing monomer-based fluoroelastomer, an ethylene/HFP/VdF/crosslinkable group-containing monomer-based fluoroelastomer, and an ethylene/HFP/TFE/crosslinkable group-containing monomer-based fluoroelastomer. Preferred is at least one selected from the group consisting of a vinylidene fluoride/crosslinkable group-containing monomer-based fluoroelastomer and a tetrafluoroethylene/propylene/crosslinkable group-containing monomer-based fluoroelastomer.

The vinylidene fluoride/crosslinkable group-containing monomer-based fluoroelastomer is preferably a copolymer containing 45 to 85 mol % of vinylidene fluoride, 50 to 14.9 mol % of at least one different monomer copolymerizable with vinylidene fluoride, and 0.1 to 5 mol % of a crosslinkable group-containing monomer. It is preferably a copolymer containing 50 to 80 mol % of vinylidene fluoride, 52 to 19.9 mol % of at least one different monomer copolymerizable with vinylidene fluoride, and 0.1 to 3 mol % of a crosslinkable group-containing monomer.

In the description, the amounts of the monomers constituting the fluoroelastomer can be calculated by any appropriate combination of NMR, FT-IR, elemental analysis, and X-ray fluorescence analysis in accordance with the types of the monomers.

Examples of the at least one different monomer copolymerizable with vinylidene fluoride include monomers such as TFE, HFP, fluoroalkyl vinyl ether, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromonomer represented by the formula (36): $CH_2=CFRf^{36}$ (wherein $Rf^{36}$ is a C1-C12 linear or branched fluoroalkyl group), a fluoromonomer represented by the formula (37): $CH_2=CH—(CF_2)_n—X^{37}$ (wherein $X^{37}$ is H or F; and n is an integer of 3 to 10), and a crosslinkable group-containing monomer; and non-fluorinated monomers such as ethylene, propylene, and alkyl vinyl ether. These may be used alone or in any combination. Preferred among these is at least one selected from the group consisting of TFE, HFP, fluoroalkyl vinyl ether, and CTFE.

The fluoroalkyl vinyl ether is preferably at least one selected from the group consisting of:

a fluoromonomer represented by the formula (38):

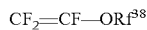

(wherein $Rf^{38}$ is a $C_1$-$C_8$ perfluoroalkyl group);

a fluoromonomer represented by the formula (39):

(wherein $Rf^{39}$ is a C1-C6 linear or branched perfluoroalkyl group, a C5-C6 cyclic perfluoroalkyl group, or a C2-C6 linear or branched perfluorooxyalkyl group containing one to three oxygen atoms); and a fluoromonomer represented by the formula (40):

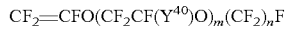

(wherein $Y^{40}$ is a fluorine atom or a trifluoromethyl group; m is an integer of 1 to 4; and n is an integer of 1 to 4).

More preferred is a fluoromonomer represented by the formula (38).

Specific examples of the vinylidene fluoride/crosslinkable group-containing monomer-based fluoroelastomer include VdF/HFP/crosslinkable group-containing monomer-based rubber, VdF/HFP/TFE/crosslinkable group-containing monomer-based rubber, VdF/CTFE/crosslinkable group-containing monomer-based rubber, VdF/CTFE/TFE/crosslinkable group-containing monomer-based rubber, VdF/fluoromonomer represented by the formula (36)/crosslinkable group-containing monomer-based rubber, VdF/fluoromonomer represented by the formula (36)/TFE/crosslinkable group-containing monomer-based rubber, VdF/perfluoro(methyl vinyl ether) (PMVE)/crosslinkable group-containing monomer-based rubber, VdF/PMVE/TFE/crosslinkable group-containing monomer-based rubber, and VdF/PMVE/TFE/HFP/crosslinkable group-containing monomer-based rubber. The VdF/fluoromonomer represented by the formula (36)/crosslinkable group-containing monomer-based rubber is preferably VdF/$CH_2=CFCF_3$/crosslinkable group-containing monomer-based rubber and the VdF/fluoromonomer represented by the formula (36)/TFE/crosslinkable group-containing monomer-based rubber is preferably VdF/TFE/$CH_2=CFCF_3$/crosslinkable group-containing monomer-based rubber.

The VdF/$CH_2=CFCF_3$/crosslinkable group-containing monomer-based rubber is preferably a copolymer containing 40 to 99.5 mol % of VdF, 0.4 to 55 mol % of $CH_2=CFCF_3$, and 0.1 to 5 mol % of a crosslinkable group-containing monomer, more preferably a copolymer containing 50 to 85 mol % of VdF, 14.9 to 47 mol % of $CH_2=CFCF_3$, and 0.1 to 3 mol % of a crosslinkable group-containing monomer.

The tetrafluoroethylene/propylene/crosslinkable group-containing monomer-based fluoroelastomer is preferably a copolymer containing 45 to 70 mol % of tetrafluoroethylene, 50 to 29.9 mol % of propylene, and 0.1 to 5 mol % of a crosslinkable group-containing fluoromonomer.

The fluoroelastomer may be a perfluoroelastomer. The perfluoroelastomer is preferably a TFE/crosslinkable group-containing monomer copolymer, more preferably a TFE/fluoromonomer represented by the formula (38), (39), or (40)/crosslinkable group-containing monomer copolymer, still more preferably a TFE/C4-C12 fluoromonomer represented by the formula (38), (39), or (40)/crosslinkable group-containing monomer copolymer.

The TFE/PMVE/crosslinkable group-containing monomer copolymer preferably has a TFE/PMVE/crosslinkable group-containing monomer ratio of (45 to 89.9)/(10 to 54.9)/(0.01 to 4) (mol %), more preferably (55 to 77.9)/(20 to 49.9)/(0.1 to 3.5), still more preferably (55 to 69.8)/(30 to 44.8)/(0.2 to 3).

The TFE/C4-C12 fluoromonomer represented by the formula (38), (39), or (40)/crosslinkable group-containing monomer copolymer preferably has a TFE/C4-C12 fluoromonomer represented by the formula (38), (39), or (40)/crosslinkable group-containing monomer ratio of (50 to 89.9)/(10 to 49.9)/(0.01 to 4) (mol %), more preferably (60 to 87.9)/(12 to 39.9)/(0.1 to 3.5), still more preferably (65 to 84.8)/(15 to 34.8)/(0.2 to 3).

A copolymer having a ratio outside the above range tends to lose the properties as an elastomer and to have properties similar to those of resin.

The perfluoroelastomer is preferably at least one selected from the group consisting of a TFE/fluoromonomer represented by the formula (40)/crosslinkable group-containing fluoromonomer copolymer and a TFE/fluoromonomer represented by the formula (38)/crosslinkable group-containing monomer copolymer.

Examples of the perfluoroelastomer also include perfluoroelastomers disclosed in documents such as WO 97/24381, JP S61-57324 B, JP H04-81608 B, and JP H05-13961 B.

In particular, the perfluoroelastomer is preferably a perfluoroelastomer containing a cyano group-containing monomer unit, more preferably a tetrafluoroethylene/perfluoro (alkyl vinyl ether)/cyano group-containing monomer copolymer. The tetrafluoroethylene/perfluoro(alkyl vinyl ether) ratio is preferably (50 to 90)/(10 to 50) mol %, more preferably (50 to 80)/(20 to 50) mol %, still more preferably (55 to 75)/(25 to 45) mol %. In order to give good crosslinkability and heat resistance, the cyano group-containing monomer is preferably in an amount of 0.1 to 5 mol %, more preferably 0.3 to 3 mol %, relative to the sum of the amounts of tetrafluoroethylene and perfluoro(alkyl vinyl ether).

Examples of the perfluoro(alkyl vinyl ether) in this case include perfluoro(methyl vinyl ether) and perfluoro(propyl vinyl ether). These may be used alone or in any combination.

In order to give excellent compression set performance at high temperature, the fluoroelastomer preferably has a glass transition temperature of −70° C. or higher, more preferably −60° C. or higher, still more preferably −50° C. or higher. In order to give good cold resistance, the glass transition temperature is preferably 5° C. or lower, more preferably 0° C. or lower, still more preferably −3° C. or lower.

The glass transition temperature can be determined as follows. Specifically, using a differential scanning calorimeter (DSC822e, available from Mettler-Toledo International Inc.), 10 mg of a sample is heated at 10° C./min to give a DSC curve, and the temperature is read at the intermediate point of two intersections between each of the extension lines of the base lines before and after the secondary transition of the DSC curve and the tangent line at the inflection point of the DSC curve.

In order to give good heat resistance, the fluoroelastomer preferably has a Mooney viscosity ML(1+20) of 30 or higher, more preferably 40 or higher, still more preferably 50 or higher, at 170° C. In order to give good processibility, this Mooney viscosity is preferably 150 or lower, more preferably 120 or lower, still more preferably 110 or lower.

In order to give good heat resistance, the fluoroelastomer preferably has a Mooney viscosity ML(1+20) of 30 or higher, more preferably 40 or higher, still more preferably 50 or higher, at 140° C. In order to give good processibility, this Mooney viscosity is preferably 180 or lower, more preferably 150 or lower, still more preferably 110 or lower.

In order to give good heat resistance, the fluoroelastomer preferably has a Mooney viscosity ML(1+10) of 10 or higher, more preferably 20 or higher, still more preferably 30 or higher, at 100° C. In order to give good processibility, this Mooney viscosity is preferably 120 or lower, more preferably 100 or lower, still more preferably 80 or lower.

The Mooney viscosity can be determined using a Mooney viscometer MV2000E available from Alpha Technologies Inc. at 170° C., 140° C., or 100° C. in conformity with JIS K 6300.

The fluoroelastomer composition of the invention contains an elongated sheet-shaped graphene.

The graphene has an elongated sheet-like shape. The graphene exhibits a ratio (L/W) of the maximum length (L) and the width (W) of 2 to $10^5$ and a ratio (L/T) of the maximum length (L) and the thickness (T) of $1\times10^1$ to $1\times10^7$. In contrast, a carbon nanotube has a cylindrical shape and is therefore different from the elongated sheet-shaped graphene.

The fluoroelastomer composition of the invention contains an elongated sheet-shaped graphene exhibiting a specific ratio (L/W) and a specific ratio (L/T), and thus can provide a molded article having much higher tensile strength and better abrasion resistance than molded articles obtained from a conventional composition containing a cylindrical carbon nanotube.

The graphene may be a graphene nanoribbon. The graphene may be either a monolayer sheet having a thickness corresponding to a single carbon atom or a multilayer sheet that is a stack of the single layers, and is preferably a monolayer sheet. The graphene may be graphene oxide.

The ratio (L/W) is preferably 3 or higher, more preferably 4 or higher, still more preferably 5 or higher, while preferably $10^4$ or lower, more preferably $10^3$ or lower.

The ratio (L/T) is preferably $2\times10^1$ or higher, more preferably $1\times10^2$ or higher, while preferably $2\times10^6$ or lower, more preferably $1\times10^6$ or lower, still more preferably $1\times10^5$ or lower.

The maximum length (L) of the graphene is preferably 1 to 2000 μm, more preferably 2 to 2000 μm. The maximum length (L) may be longer than 500 nm.

The width (W) of the graphene is preferably 20 to 500 nm, more preferably 20 to 300 nm.

The thickness (T) of the graphene is preferably 1 to 50 nm, more preferably 1 to 20 nm.

The maximum length (L), width (W), and thickness (T) of the graphene can be determined by observing the graphene using a scanning electron microscope (SEM), a transmission electron microscope (TEM), an atomic force microscope (AFM), or the like. Each value may be an average value.

The graphene preferably has a specific surface area of 200 to 2500 $m^2/g$, more preferably 400 to 2500 $m^2/g$.

The specific surface area of the graphene can be determined by nitrogen gas adsorption. The nitrogen gas adsorption is specifically described in non-patent literature, Kosynkin, Dmitry V., et al., Nature, 458.7240(2009):872-876.

The graphene may be produced by a method known as a method for producing the graphene nanoribbon. Examples of the method for producing a graphene nanoribbon include mechanical peeling, chemical peeling, SiC epitaxial growth, and chemical vapor deposition. For example, the graphene may be obtained by cleaving a carbon nanotube in the longitudinal direction using an oxidizing agent.

In order to achieve a crosslinking reaction at a sufficient rate and to provide a fluoroelastomer molded article having much higher tensile strength and much better abrasion resistance, the fluoroelastomer composition of the invention preferably contains the graphene in an amount of 0.1 to 20% by mass relative to the sum of the amounts of the fluoroelastomer and the graphene. In order to lead to a fluoroelastomer molded article having still much better abrasion resistance, the amount of the graphene is more preferably 0.2% by mass or more, still more preferably 0.5% by mass or more, further more preferably 1% by mass or more, particularly preferably 2% by mass or more, most preferably 3% by mass or more. In order to lead to an elastomer molded article having flexibility, the amount is more preferably 15% by mass or less, still more preferably 10% by mass or less.

The fluoroelastomer composition of the invention preferably contains a cross-linking agent that can be crosslinked with the crosslinkable group contained in the fluoroelastomer or a catalyst that causes a reaction of the crosslinkable groups to bond to each other and to thereby generate a crosslinked structure. Still, the cross-linking agent and the catalyst are not essential components in the fluoroelastomer composition of the invention. Even without these components, the fluoroelastomer composition of the invention can provide a fluoroelastomer molded article having much higher tensile strength and much better abrasion resistance.

In the case where the crosslinkable group is a cyano group, the catalyst is preferably a catalyst that causes a reaction of three cyano groups to generate a triazine ring. In other words, in a preferred embodiment, the fluoroelastomer composition of the invention further contains a catalyst that generates a triazine ring and the crosslinkable group is a cyano group.

The catalyst that generates a triazine ring is preferably an organic or inorganic tin compound; an organic or inorganic ammonium salt disclosed in JP H09-111081 A; ammonia; a support with ammonia adsorbed thereon; or a compound that is pyrolyzed to generate ammonia disclosed in JP 2007-502890 T. Examples of the compound that is pyrolyzed to generate ammonia include urea and thiourea.

Examples of the organic tin compound include tetraphenyl tin and triphenyl tin. The amount thereof is preferably 0.05 to 10 parts by mass, more preferably 1 to 5 parts by mass, relative to 100 parts by mass of the fluoroelastomer. Less than 0.05 parts by mass of the organic tin compound tends to cause insufficient crosslinking of the fluoroelastomer, while more than 10 parts by mass thereof tends to cause poor physical properties of the molded article.

The catalyst that generates a triazine ring is preferably at least one selected from the group consisting of a compound that generates ammonia at 40° C. to 330° C. (other than particulate inorganic nitrides; hereinafter, also referred to as an ammonia-generating compound) and a particulate inorganic nitride. Ammonia and the particulate inorganic nitride may be used in combination, or the ammonia-generating compound and the particulate inorganic nitride may be used in combination.

For the compound that generates ammonia at 40° C. to 330° C., the ammonia generated at a crosslinking reaction temperature (40° C. to 330° C.) has a catalytic effect of causing crosslinking of the fluoroelastomer. Thus, such a compound is different from a cross-linking agent that is to be incorporated as a structural unit into the molded article after the crosslinking. Some of such compounds may react with a slight amount of water to generate ammonia. The reason of setting the temperature at which ammonia is generated to 40° C. to 330° C. is that the fluoroelastomer composition containing a compound that generates ammonia at a temperature lower than 40° C. may have poor storage stability, while the fluoroelastomer composition containing a compound that generates ammonia at a temperature higher than 330° C. may cause generation of ammonia from the molded article when the molded article is used at high temperature.

The ammonia-generating compound is preferably at least one selected from the group consisting of urea, a urea derivative, and an ammonium salt, more preferably at least one selected from the group consisting of urea and an ammonium salt. The ammonium salt may be either an organic ammonium salt or an inorganic ammonium salt.

Examples of the urea derivative include urea derivatives such as biurea, thiourea, urea hydrochloride, and biuret.

Examples of the organic ammonium salt include compounds disclosed in documents such as JP H09-111081 A, WO 00/09603, and WO 98/23675, including ammonium polyfluorocarboxylates, e.g., ammonium perfluorohexanoate and ammonium perfluorooctanoate; ammonium polyfluorosulfonates, e.g., ammonium perfluorohexanesulfonate and ammonium perfluorooctanesulfonate; polyfluoroalkyl group-containing ammonium phosphates or phosphonates, e.g., ammonium perfluorohexanephosphate and ammonium perfluorooctanephosphate; and fluorine-free ammonium carboxylates or sulfonates, e.g., ammonium benzoate, ammonium adipate, and ammonium phthalate. In order to achieve good dispersibility, preferred are fluorine-containing ammonium carboxylates, sulfonates, or phosphates. In order to achieve inexpensiveness, preferred are fluorine-free ammonium carboxylates, sulfonates, or phosphates.

Examples of the inorganic ammonium salt include compounds disclosed in JP H09-111081 A, such as ammonium sulfate, ammonium carbonate, ammonium nitrate, and ammonium phosphate. In consideration of the crosslinkability, preferred is ammonium phosphate.

Other examples include acetaldehyde ammonia, hexamethylene tetramine, formamidine, formamidine hydrochloride, formamidine acetate, t-butyl carbamate, benzyl carbamate, $HCF_2CF_2CH(CH_3)OCONH_2$, and phthalamide.

The ammonia-generating compounds may be used alone or in combination of two or more.

The amount of the ammonia-generating compound may be selected as appropriate in accordance with the amount of ammonia to be generated, and is usually 0.05 to 10 parts by mass, preferably 0.1 to 5 parts by mass, more preferably 0.2 to 3 parts by mass, relative to 100 parts by mass of the fluoroelastomer. Too small an amount of the ammonia-generating compound tends to cause a low crosslinking density, resulting in a failure in achieving practically sufficient heat resistance and chemical resistance. Too large an amount thereof tends to unfortunately cause scorch, resulting in poor storage stability.

Examples of the particulate inorganic nitride include, but are not limited to, silicon nitride ($Si_3N_4$) particles, lithium nitride particles, titanium nitride particles, aluminum nitride particles, boron nitride particles, vanadium nitride particles, and zirconium nitride particles. In order to give nanometer-scale fine particles, preferred are silicon nitride particles. These particulate nitrides may be used in combination of two or more.

The particulate inorganic nitride may have any particle size, which is preferably 1000 nm or smaller, more preferably 300 nm or smaller, still more preferably 100 nm or smaller. The lower limit thereof is not limited.

The amount of the particulate inorganic nitride is usually 0.1 to 20 parts by mass, preferably 0.2 to 5 parts by mass, more preferably 0.2 to 1 part by mass, relative to 100 parts by mass of the fluoroelastomer. Less than 0.1 parts by mass of the particulate inorganic nitride tends to cause a low crosslink density, resulting in a failure in achieving practically sufficient heat resistance and chemical resistance. More than 20 parts by mass thereof tends to unfortunately cause scorch, resulting in poor storage stability.

The cross-linking agent is not an essential component, but the fluoroelastomer composition of the invention may further contain the cross-linking agent. Examples of the cross-linking agent include a cross-linking agent to be used in peroxide crosslinking, polyol crosslinking, polyamine crosslinking, oxazole crosslinking, imidazole crosslinking, or thiazole crosslinking. The cross-linking agent is preferably at least one selected from the group consisting of an oxazole cross-linking agent, an imidazole cross-linking agent, and a thiazole cross-linking agent. These cross-linking agents are particularly suitable for the case where the fluoroelastomer contains a cyano group as a crosslinkable group.

The cross-linking agent to be used in peroxide crosslinking is an organic peroxide that can easily generate a peroxy radical in the presence of heat or an redox system. Examples thereof include 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoyl peroxide, t-butyl peroxybenzene, 2,5-dimethyl-2,5-di(benzoylperoxy)hexane, t-butyl peroxymaleic acid, and t-butyl peroxyisopropyl carbonate. The type and amount of the organic peroxide are selected usually in consideration of factors such as the amount of active —O—O— and the decomposition temperature.

The crosslinking aid to be used in this case is a compound having reactivity with a peroxy radical and a polymer radical. Examples thereof include a multifunctional compounds containing a functional group such as $CH_2=CH-$, $CH_2=CHCH_2-$, or $CF_2=CF-$. Specific examples thereof include triallyl cyanurate, triallyl isocyanurate (TAIC), triacrylformal, triallyl trimellitate, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallyl acrylamide, and 1,6-divinyl dodecafluorohexane.

Examples of the cross-linking agent to be used in polyol crosslinking include polyhydric alcohol compounds such as bisphenol A and bisphenol AF.

The cross-linking agent to be used in polyamine crosslinking include polyvalent amine compounds such as hexamethylene diamine carbamate, N,N'-dicinnamylidene-1,6-hexanediamine, and 4,4'-bis(aminocyclohexyl)methane carbamate.

The cross-linking agent to be used in oxazole crosslinking, imidazole crosslinking, or thiazole crosslinking may be, for example:

a bisdiaminophenyl cross-linking agent, bisaminophenol cross-linking agent, or bisaminothiophenol cross-linking agent represented by the following formula (51):

[Chem. 1]

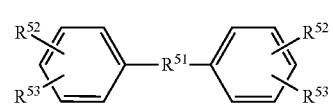

(wherein $R^{51}$ is —$SO_2$—, —O—, —CO—, a C1-C6 alkylene group, a C1-C10 perfluoroalkylene group, or a single bond; one of $R^{52}$ or $R^{53}$ is —$NH_2$ and the other is —$NH_2$, —OH, or —SH, preferably both $R^{52}$ and $R^{53}$ are —$NH_2$);

a bisamidrazone cross-linking agent or bisamidoxime cross-linking agent represented by the following formula (52):

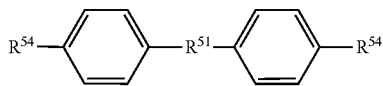

[Chem. 2]

(wherein $R^{51}$ is defined as described above; and $R^{54}$ is a compound represented by the following formula (53):

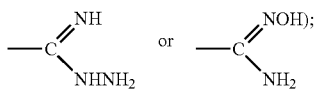

[Chem. 3]

or a bisamidrazone cross-linking agent or a bisamidoxime cross-linking agent represented by the following formula (54):

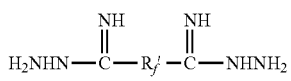

[Chem. 4]

(wherein $R_f^1$ is a C1-C10 perfluoroalkylene group) or the following formula (55):

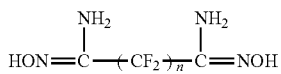

[Chem. 5]

(wherein n is an integer of 1 to 10). The bisaminophenol cross-linking agent, the bisaminothiophenol cross-linking agent, the bisdiaminophenyl cross-linking agent, and the like can be used for crosslinking where a cyano group serves as a crosslinking site, and they can also react with a carboxy group and an alkoxycarbonyl group to form an oxazole ring, a thiazole ring, or an imidazole ring, providing a crosslinked product.

In order to achieve particularly good heat resistance, good crosslinking reactivity, and relatively easy synthesis, more preferred among the cross-linking agents are bisdiaminophenyl cross-linking agent containing at least two bisaminocrosslinkable functional groups represented by the following formula (56):

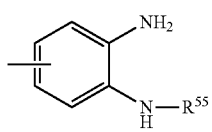

[Chem. 6]

(wherein $R^{55}$ is a fluorine atom or a monovalent organic group). Examples of the functional group reactive with this crosslinkable functional group include a cyano group, a carboxy group, and an alkoxycarbonyl group. The reaction thereof leads to formation of an imidazole ring.

A still more preferred cross-linking agent is a compound represented by the following formula (57):

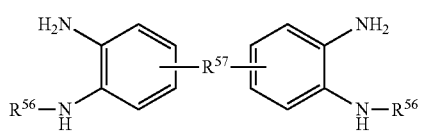

[Chem. 7]

(wherein $R^{56}$ is a monovalent organic group other than hydrogen or a fluorine atom; $R^{57}$ is —$SO_2$—, —O—, —CO—, an alkylene group optionally substituted, a group represented by the following formula (58):

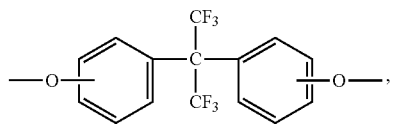

[Chem. 8]

or a single bond).

$R^{56}$ is particularly preferably a substituent that forms an N—$R^{56}$ bond having higher oxidation resistance than an N—H bond. The "substituent that forms an N—$R^{56}$ bond having higher oxidation resistance than an N—H bond" means a substituent that forms an N—$R^{56}$ bond present in a compound that is less likely to be oxidized than a compound having an N—H bond when an imidazole ring is formed.

Examples of such $R^{56}$ include, but are not limited to, an aliphatic hydrocarbon group optionally substituted and a phenyl or benzyl group optionally substituted.

Specifically, for example, at least one $R^{56}$ is a C1-C10, especially C1-C6 lower alkyl group such as —$CH_3$, —$C_2H_5$, or —$C_3H_7$; a C1-C10, especially C1-C6 fluorine-containing lower alkyl group such as —$CF_3$, —$C_2F_5$, —$CH_2F$, —$CH_2CF_3$, or —$CH_2C_2F_5$; a phenyl group; a benzyl group; a phenyl or benzyl group in which one to five hydrogen atoms are replaced by fluorine atoms, such as —$C_6F_5$ or —$CH_2C_6F_5$; or a phenyl or benzyl group in which one to five hydrogen atoms are replaced by —$CF_3$, such as —$C_6H_{5-n}(CF_3)_n$ or —$CH_2C_6H_{5-n}(CF_3)_n$ (wherein n is an integer of 1 to 5).

In order to achieve particularly good heat resistance, good crosslinking reactivity, and relatively easy synthesis, preferred among these are a phenyl group and —$CH_3$.

In the compound of the formula (57), preferred specific examples of the optionally substituted alkylene group for $R^{57}$ include, but are not limited to, a C1-C6 non-substituted alkylene group and a C1-C10 perfluoroalkylene group. The perfluoroalkylene group may be a group represented by the following formula (59).

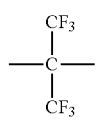

[Chem. 9]

$R^{57}$ to be used may be known ones disclosed as examples of bisdiaminophenyl compounds in documents such as JP H02-59177 B and JP H08-120146 A.

$R^{57}$ may bind to any position of each of left and right benzene rings. In order to enable easy synthesis and an easy crosslinking reaction, $R^{57}$ preferably bind to the para-position relative to the $NH_2$ or $NHR^{56}$ group.

A particularly preferred cross-linking agent is a compound represented by the following formula (60):

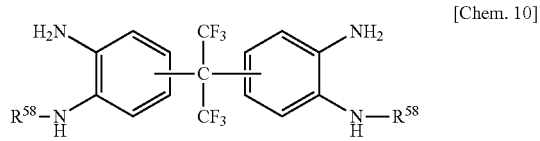

[Chem. 10]

wherein $R^{58}$s are the same as or different from each other, and are each a C1-C10 alkyl group, a fluorine-containing C1-C10 alkyl group, a phenyl group, a benzyl group, or a phenyl or benzyl group in which one to five hydrogen atoms are replaced by fluorine atoms or —$CF_3$.

Examples of the compound represented by the formula (60) include 2,2-bis-[3-amino-4-(N-methylamino)phenyl] hexafluoropropane, 2,2-bis-[3-amino-4-(N-ethylamino)phenyl]hexafluoropropane, 2,2-bis-[3-amino-4-(N-propylamino)phenyl]hexafluoropropane, 2,2-bis-[3-amino-4-(N-phenylamino)phenyl]hexafluoropropane, 2,2-bis-[3-amino-4-(N-perfluorophenylamino)phenyl]hexafluoropropane, 2,2-bis-[3-amino-4-(N-benzylamino)phenyl]hexafluoropropane, 2,2-bis(3-amino-4-hydroxyphenyl)hexafluoropropane (generic name: bis(aminophenol) AF), 2,2-bis(3-amino-4-mercaptophenyl)hexafluoropropane, tetraaminobenzene, bis-3,4-diaminophenylmethane, bis-3,4-diaminophenyl ether, and 2,2-bis(3,4-diaminophenyl)hexafluoropropane.

The amount of the cross-linking agent is preferably 0.05 to 10 parts by mass, more preferably 0.5 to 5 parts by mass, relative to 100 parts by mass of the fluoroelastomer. Less than 0.05 parts by mass of the cross-linking agent tends to cause insufficient crosslinking of the fluoroelastomer, while more than 10 parts by mass thereof tends to cause poor physical properties of the molded article.

The fluoroelastomer composition of the invention can also be crosslinked by high energy rays without addition of a cross-linking agent, for example. Examples of the crosslinking source include X-rays, α-rays, β-rays, γ-rays, electron beams, proton beams, deuteron beams, and ultraviolet rays. The radiation dose in this case is 0.1 to 50 Mrad. The irradiation temperature is −20° C. to 100° C. The irradiation atmosphere is in the presence of the air, nitrogen, argon, or helium, or in a vacuum.

The fluoroelastomer composition of the invention may contain a common filler.

Examples of the filler include imide fillers having an imide structure, such as polyimide, polyamide-imide, and polyetherimide; engineering plastic-based organic fillers such as polyarylate, polysulfone, polyethersulfone, polyphenylene sulfide, polyether ether ketone, polyether ketone, and polyoxy benzoate; and inorganic fillers such as metal oxide fillers, e.g., aluminum oxide, silicon oxide, and yttrium oxide, metal carbide, e.g., silicon carbide and aluminum carbide, metal nitride fillers, e.g., silicon nitride and aluminum nitride, aluminum fluoride, carbon fluoride, and carbon black.

In order to give an effect of blocking a variety of plasma, preferred among these are aluminum oxide, yttrium oxide, silicon oxide, polyimide, and carbon fluoride.

The inorganic fillers and organic fillers may be used alone or in combination of two or more.

The amount of the filler is preferably 0.5 to 100 parts by mass, more preferably 5 to 50 parts by mass, relative to 100 parts by mass of the fluoroelastomer.

In the fields not requiring high purity and stain resistance, the fluoroelastomer composition of the invention may optionally contain any of common additives to be blended with the fluoroelastomer, such as a processing aid, a plasticizer, and a colorant, and may contain one or more of common cross-linking agents and crosslinking aids other than those mentioned above.

The fluoroelastomer composition of the invention can be produced by kneading the fluoroelastomer and the graphene. The kneading can be performed using a common polymer processing machine, such as an open roll, a Banbury mixer, a kneader, or a closed-type mixer.

The fluoroelastomer composition of the invention can suitably be used as a molding material to be molded into a molded article.

The fluoroelastomer composition of the invention may be molded into a molded article by a common method. The method may be a known method such as heat compression in a mold, injection into a heated mold, or extrusion through an extruder.

The fluoroelastomer composition of the invention may be formed into a pre-molded article and the pre-molded article may be crosslinked into a molded article by a common method. The method may be heat compression in a mold, injection into a heated mold, or a method including extrusion through an extruder, followed by primary crosslinking, and followed by secondary crosslinking. In the case of extruded products such as hoses and electric wires, a molded article can be obtained by heat-crosslinking the extrudate by steam, for example.

The primary crosslinking is preferably performed at 150° C. to 200° C. for 5 to 120 minutes, more preferably at 170° C. to 190° C. for 5 to 60 minutes. The crosslinking technique may be a known crosslinking technique such as press crosslinking.

The secondary crosslinking is preferably performed at 250° C. to 320° C. for 2 to 24 hours, more preferably at 280° C. to 310° C. for 5 to 20 hours. The crosslinking technique may be a known crosslinking technique such as oven crosslinking.

The invention also relates to a fluoroelastomer molded article formed from the fluoroelastomer composition.

The fluoroelastomer molded article of the invention can suitably be used as a sealant for semiconductor manufacturing devices requiring particularly high cleanliness, especially semiconductor manufacturing devices involving high density plasma irradiation. Examples of the sealant include O-rings, square rings, gaskets, packings, oil seals, bearing seals, and lip seals.

The fluoroelastomer molded article of the invention can also be used for a variety of polymer products used in semiconductor manufacturing devices, such as diaphragms, tubes, hoses, a variety of rubber rolls, and belts, and can also be used for coating materials and lining materials.

The semiconductor manufacturing devices in the invention are not limited to devices for manufacturing semiconductors, but generally widely include manufacturing devices used in the semiconductor field requiring high cleanliness, such as devices for manufacturing liquid crystal panels or plasma panels. Examples thereof include the following.

(1) Etching Systems
  Dry etching systems
  Plasma etching systems
  Reactive ion etching systems
  Reactive ion beam etching systems
  Sputter etching systems
  Ion beam etching systems
  Wet etching systems
  Ashing systems
(2) Cleaning Systems
  Dry etching and cleaning systems
  UV/$O_3$ cleaning systems
  Ion beam cleaning systems
  Laser beam cleaning systems
  Plasma cleaning systems
  Gas etching and cleaning systems
  Extraction and cleaning systems
  Soxhlet extraction and cleaning systems
  High-temperature and high-pressure extraction and cleaning systems
  Microwave extraction and cleaning systems
  Supercritical extraction and cleaning systems
(3) Exposure Systems
  Steppers
  Coaters/developers
(4) Polishing systems
  CMP systems
(5) Film deposition systems
  CVD systems
  Sputtering systems
(6) Diffusion and Ion Implantation Systems
  Oxidation and diffusion systems
  Ion implantation systems The fluoroelastomer molded article of the invention exhibits excellent performance as a sealant of a CVD system, a plasma etching system, a reactive ion etching system, an ashing system, or an excimer laser exposure system, for example.

EXAMPLES

The invention is described hereinbelow with reference to, but not limited to, examples.

(1) Production of Sample in Examples 1 to 3 and Comparative Examples 1 to 4

First, 1.5 g of a multiwall carbon nanotube (MWCNT, VGCF-H, available from Showa Denko K.K.) was mixed with 60 ml of concentrated sulfuric acid and stirred for one hour. Then, 7.5 g of potassium permanganate was added thereto and the mixture was stirred for one hour. The resulting dispersion was heated up to 55° C. and stirred for one hour, then heated up to 70° C. and stirred for 30 minutes. The dispersion was then cooled down to room temperature. To this dispersion was added 400 ml of ice water containing 30 ml of hydrogen peroxide water to prevent deposition of insoluble manganese dioxide. The mixture was subjected to suction filtration using a polytetrafluoroethylene filter having a pore size of 0.45 µm. The resulting solid was dispersed in 150 ml of water and the dispersion was sonicated for 30 minutes. This dispersion was mixed with 100 ml of 0.5 mol/l hydrochloric acid to agglomerate the solid, and then subjected to suction filtration using a polytetrafluoroethylene filter having a pore size of 0.45 µm. The resulting solid was dispersed in 200 ml of ethanol and the dispersion was sonicated for 30 minutes. This dispersion was mixed with 200 ml of hexane, and then the mixture was subjected to suction filtration using a polytetrafluoroethylene filter having a pore size of 0.45 µm. The resulting solid was heated up to 60° C. and dried for 24 hours in a vacuum oven, whereby a graphene oxide (GO) was obtained.

The graphene oxide had the following dimensions and parameters.
  Length (L)=1,000 to 2,000 nm
  Width (W)=470 nm (maximum), 240 nm (average)
  Thickness (T)=10 nm (value obtained by the same method as described in Kosynkin, Dmitry V. et al., Nature, 458.7240 (2009): 872-876))
  Specific surface area=440 m$^2$/g
  L/W=4 to 8 (average)
  L/T=100 to 200

Next, 10 g of crude rubber of a tetrafluoroethylene-perfluoro(propyl vinyl ether) elastomer containing a cyano group-containing monomer unit was mixed with 100 g of a solvent (Fluorinert FC-770, available from 3M Co.) and stirred for 24 hours. Thereby, the crude rubber was swelled. Then, 0.1 g of the same multiwall carbon nanotube as the material of the graphene oxide or 0.1 g of the graphene oxide was dispersed in 10 ml of a solvent (Fluorinert FC-770, available from 3M Co.). The dispersion was sonicated at 45 kHz for two hours, whereby the agglomerated mass was deagglomerated. The filler dispersion was mixed with the swelled crude rubber at a ratio shown in Table 1 for Examples 1 to 3 or in Table 2 for Comparative Examples 1 to 4, and the mixture was kneaded using a mixer for 20 minutes. Then, the mixture was stirred in a planetary centrifugal mixer in the open state for two minutes to remove the solvent in the mixture, and then heated up to 80° C. in a hot air furnace and left to stand for three hours. The resulting filler-dispersed non-crosslinked elastomer was pressed using a hot press at 140° C. and at 10 MPa for 20 minutes, whereby a 500-µm-thick sheet was obtained. The resulting sheet was put into a desiccator together with 1 g of silicon nitride and 10 ml of ammonia water. The system was heated up to 140° C. and maintained for 72 hours for crosslinking.

TABLE 1

| | Component | Unit | Example 1 | Example 2 | Example 3 |
|---|---|---|---|---|---|
| Composition | FFKM | wt % | 99 | 95 | 90 |
| | MWCNT | wt % | 0 | 0 | 0 |
| | GO | wt % | 1 | 5 | 10 |

TABLE 2

| | Component | Unit | Comparative Example 1 | Comparative Example 2 | Comparative Example 3 | Comparative Example 4 |
|---|---|---|---|---|---|---|
| Composition | FFKM | wt % | 100 | 99 | 95 | 90 |
| | MWCNT | wt % | 0 | 1 | 5 | 10 |
| | GO | wt % | 0 | 0 | 0 | 0 |

(2) Physical Tests

The filler-dispersed elastomer sheets of Examples 1 to 3 and Comparative Examples 1 to 4 were each formed into a JIS No. 7 dumbbell-shaped test piece using a punching blade. These test pieces were subjected to a tensile test using a tensile tester at a tensile rate of 50 mm/min. Based on the resulting stress-strain curve, the tensile modulus (MPa), the tensile strength (MPa), and the elongation at break were determined.

The filler-dispersed elastomer sheets of Examples 1 to 3 and Comparative Examples 1 to 4 were each cut into a test piece having a length of 80 mm and a width of 5 mm. These test pieces were subjected to a friction abrasion test. The friction abrasion test was performed in conformity with the method disclosed in Non-Patent Literature 2 such that a 100-mm-diameter rotary drum whose side face is coated with #320 abrasive paper was rotated at 500 rpm and the sample was brought into contact with this side face. The friction coefficient ($\mu$) and the wear rate (Ws ($Pa^{-1}$)) were determined. The lower the wear rate is, the higher the abrasion resistance is.

The filler-dispersed elastomer sheets of Examples 1 to 3 and Comparative Examples 1 to 4 were each cut into a 20-mm square sample. Each sample was immersed in a 50 ml of solvent (Fluorinert FC-770, available from 3M Co.) and left to stand for seven days. The sample shape was then observed, whereby the solubility of the sample in the solvent was examined.

In Tables 3 and 4, the measurement results of the tensile modulus, the tensile strength, the elongation at break, the friction coefficient, and the wear rate were respectively expressed by "E (MPa)", "TS (MPa)", "Eb", "$\mu$", and "Ws ($Pa^{-1}$)".

TABLE 3

| | Unit | Example 1 | Example 2 | Example 3 |
|---|---|---|---|---|
| E | MPa | 3.61 | — | — |
| TS | MPa | 17.4 | — | — |
| Eb | | 2.73 | — | — |
| $\mu$ | | 0.48 | 0.41 | 0.39 |
| Ws | $10^{-11} Pa^{-1}$ | 2.31 | 1.48 | 1.84 |

TABLE 4

| | Unit | Comparative Example 1 | Comparative Example 2 | Comparative Example 3 | Comparative Example 4 |
|---|---|---|---|---|---|
| E | MPa | 1.10 | 3.64 | — | — |
| TS | MPa | 3.26 | 13.9 | — | — |
| Eb | | 2.14 | 2.46 | — | — |
| $\mu$ | | 0.64 | 0.47 | 0.48 | 0.44 |
| Ws | $10^{-11} Pa^{-1}$ | 7.63 | 6.66 | 5.63 | 4.80 |

Tables 3 and 4 show that the tensile strength (TS) and the elongation at break (Eb) were respectively 13.9 MPa and 2.46 in Comparative Example 2, while they were respectively 17.4 MPa and 2.73 in Example 1. The tensile modulus (E) was 3.64 MPa in Comparative Example 2, while it was 3.61 MPa in Example 1 and was hardly different from that in Comparative Example 2. These results demonstrate that dispersing the graphene oxide increased the tensile strength by 25% without impairing the easiness of shape change unique to elastomers (without increasing the tensile modulus) in comparison with the case of dispersing the multiwall carbon nanotube.

Tables 3 and 4 show that the friction coefficient ($\mu$) was 0.44 to 0.64 in Comparative Examples 1 to 4, while it was 0.39 to 0.48 in Examples 1 to 3. The wear rate (Ws) was 4.80 to $7.63 \times 10^{-11}$ $Pa^{-1}$ in Comparative Examples 1 to 4, while it was 1.48 to $2.31 \times 10^{-11}$ $Pa^{-1}$ in Examples 1 to 3. These results demonstrate that dispersing the graphene oxide instead of the multiwall carbon nanotube improved the abrasion resistance.

In the test of examining the solubility of the sample in a solvent, the non-crosslinked sample started to be dissolved after about 20 minutes from the start of immersing the sample in the solvent and was completely dissolved after one hour therefrom. In contrast, no change of the sample and no dissolution of the filler in the solvent were observed in Examples 1 to 3. These results demonstrate that dispersion of the graphene oxide does not reduce the crosslinking reaction.

The invention claimed is:

1. A fluoroelastomer composition comprising:
   a fluoroelastomer that contains a crosslinkable group-containing monomer unit; and
   an elongated sheet-shaped graphene oxide,
   the graphene oxide exhibiting a ratio (L/W) of a maximum length (L) and a width (W) of 2 to $10^5$, and the graphene oxide exhibiting a ratio (L/T) of the maximum length (L) and a thickness (T) of $1 \times 10^1$ to $1 \times 10^7$,
   wherein the crosslinkable group is at least one selected from the group consisting of a cyano group, a carboxy group, an alkoxycarbonyl group, and an acid halide group, and
   wherein the fluoroelastomer composition contains the graphene oxide in an amount of 0.1 to 20% by mass of a sum of amounts of the fluoroelastomer and the graphene oxide.

2. The fluoroelastomer composition according to claim 1, wherein the fluoroelastomer is a perfluoroelastomer.

3. The fluoroelastomer composition according to claim 1, further comprising a catalyst that generates a triazine ring, wherein the crosslinkable group is a cyano group.

4. The fluoroelastomer composition according to claim 1, further comprising a cross-linking agent.

5. The fluoroelastomer composition according to claim 4, wherein the cross-linking agent is at least one selected from the group consisting of an oxazole cross-linking agent, an imidazole cross-linking agent, and a thiazole cross-linking agent.

6. A fluoroelastomer molded article formed from the fluoroelastomer composition according to claim 1.

* * * * *